March 5, 1940.  L. B. KENDALL  2,192,791
METER READING INSTRUMENT
Filed May 24, 1938
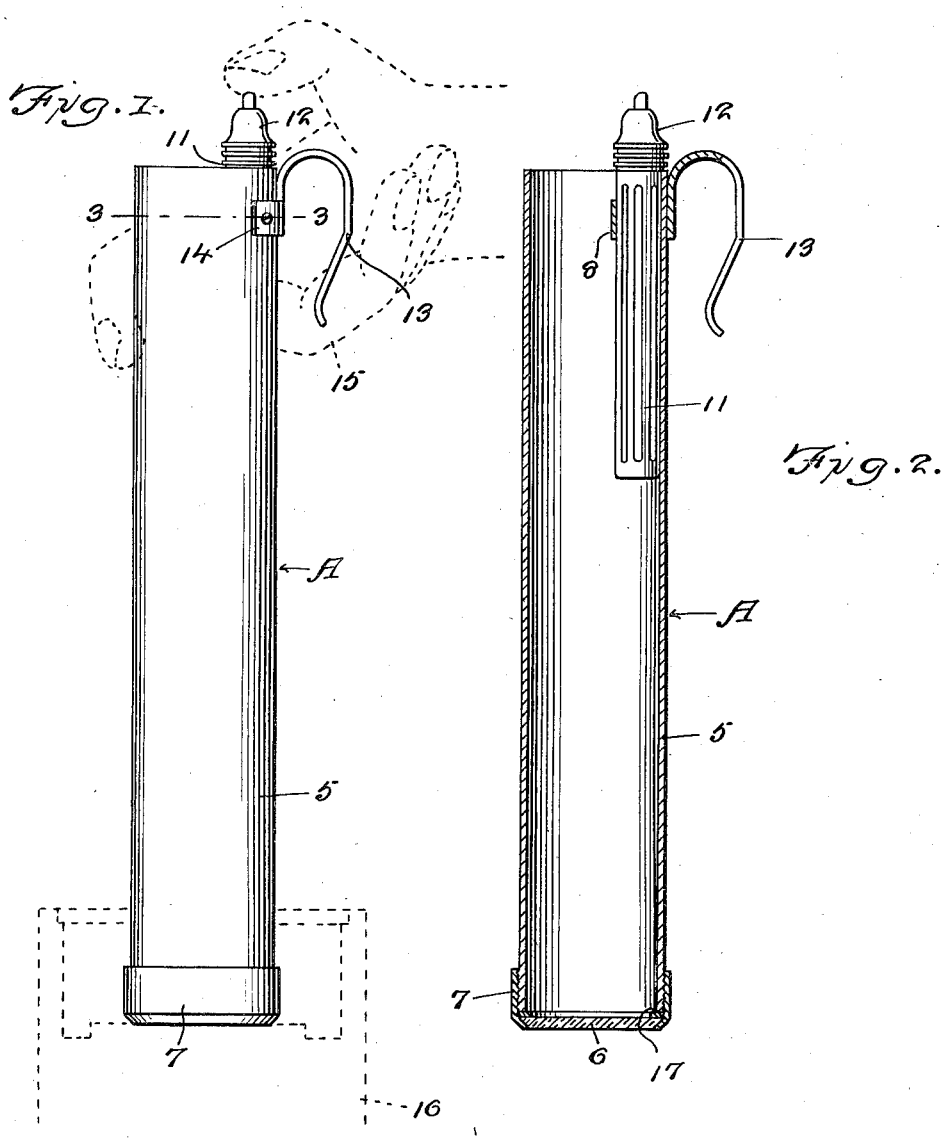

Patented Mar. 5, 1940

2,192,791

UNITED STATES PATENT OFFICE 2,192,791

METER READING INSTRUMENT

Leonard B. Kendall, North Little Rock, Ark.

Application May 24, 1938, Serial No. 209,841

1 Claim. (Cl. 88—1)

The invention relates to an electric meter reader, and more especially to lighting instruments for use in reading water meters submerged in water.

The primary object of the invention is the provision of an instrument of this character, wherein an electric flash light or the like can be conveniently held to be protected from water and the light therefrom directed onto a meter submerged in muddy water due to rainy weather and seepage where the said meter is located beneath the surface of a street, roadway or other surface, so that the dial of such meter will be clearly visible for the reading thereof.

Another object of the invention is the provision of an instrument of this character, wherein the construction is novel in its entirety and can be hung upon the belt or carried within the pocket of a person delegated for the reading of meters, being also susceptible for other lighting purposes.

A further object of the invention is the provision of an instrument of this character, wherein the lamp casing is fitted within said instrument in a novel and unique manner to be held in proper light projecting position when the instrument is being employed for service.

A still further object of the invention is the provision of an instrument of this character, which is extremely simple in construction, thoroughly reliable and efficient in operation, easy of handling, strong, durable, convenient for carriage on the person, and inexpensive to manufacture.

With these and other objects in view, the invention consists in the features of construction, combination and arrangement of parts as will be hereinafter more fully described, illustrated in the accompanying drawing which discloses the preferred embodiment of the invention, and pointed out in the claim hereunto appended.

In the accompanying drawing:

Figure 1 is an elevation of the instrument constructed in accordance with the invention, being applied and held in the hand of an operator.

Figure 2 is a vertical longitudinal sectional view of the same.

Figure 3 is a sectional view taken approximately on the line 3—3 of Figure 1.

Similar reference characters indicate corresponding parts throughout the several views in the drawing.

Referring to the drawing in detail, A designates generally the instrument constituting the present invention, in that in many parts of the country, particularly in low lands, water seeps into the box or housing for a water meter employed with water systems making it difficult to take a reading of the meter dial with resultant inconvenience and considerable delay to one delegated to make such readings. The instrument A allows the reading of a meter to be had with dispatch and without inconvenience to the reader, as well as in the reading of dry meters.

The instrument A comprises a cylinder or tube body 5, preferably made from metal, being normally open at opposite ends and closing one of these ends is a lens 6, which is held in a collar 7, adapted to be threaded on or otherwise separably fastened to the body 5. This lens 6 projects light from within the body 5 in the use of the instrument in a manner presently described.

Interiorly of the body 5 and close to the other open end thereof is a substantially segmental shape bracket 8, being fastened to the said body preferably by screws 9, and this bracket has a central opening 10 thereon for the frictional fitting therein of a pencil-like flash light casing 11. The light projecting end of the casing 11 is in the direction of the lens 6, while the other end of this casing 11 is slightly projected from the body 5 and has built therewith a switch 12 for the turning on and off of the light. This casing 11 is adapted under fitting within the opening 10 for adjustment longitudinally of the body 5 to a reasonable extent. The flash light or lamp is of the usual electrically illuminated bulb type.

Fitted exteriorly of the body 5 is a hanger hook 13, being fastened in place by the screws 9, the laterally spread ears 14 being for the reception of the latter. This hook 13 serves not only as a hanger but also as a finger or hand hold, an illustration of the latter being indicated at 15, particularly when the instrument is placed properly to a meter denoted at 16. This position of the instrument A relative to the meter 16 enables convenient reading of the dial of such meter when the box or housing (not shown) for accommodating the same has been filled with muddy water or rain water, the positioning being exhibited in Figure 1 of the drawing.

In the application of the instrument the same is held in a vertical position by two fingers of one hand with the thumb of an operator pressed down on the plunger of the switch 12 of the light or lamp. The instrument is then placed with the lens 6 over the glass of the meter 16 at the dial (the light being on) and moved gently in a vertical movement over the meter dial glass, thus creating an agitation of the water and displacing all water and sediment from the meter dial glass. The dial, therefore, becomes easily visible through the open upper end of the body 5 of the instrument for a reading of said dial.

The lens 6 is fitted with the collar 7 to the body 5 through the use of a gasket or the like 17 so that the submerged lower end of the instrument A will be leakproof.

The hook 13 allows of the instrument A to be carried on the person or such instrument may be carried in the pocket of a garment.

What is claimed is:

A lighting instrument of the kind described comprising an elongated cylindrical body having a lens closing one end and an opposite open end, a flash light having a push button switch at one end located interiorly of said body at the open end thereof with the push button switch protruded slightly through said open end, a hanger hook fixed exteriorly to the body next to the open end thereof for presenting a finger or thumb of a hand to the push button switch when grasping said hanger hook, and a collar interiorly of said body next to the open end thereof in confronting relation to the said hook for frictionally receiving the flash light, the flash light being disposed longitudinally in the body and having its light projecting end directed toward the end of said body closed by the lens.

LEONARD B. KENDALL.